United States Patent [19]

Hirano et al.

[11] 3,853,414
[45] Dec. 10, 1974

[54] BALL JOINT APPARATUS

[75] Inventors: Koki Hirano, Fujisawa; Kyoji Kobayashi, Chigasaki, both of Japan

[73] Assignee: Jidosha Denki Kogyo Kabushiki Kaisha, Kanagawa-ken, Japan

[22] Filed: Apr. 25, 1972

[21] Appl. No.: 247,276

[52] U.S. Cl. ............... 403/71, 403/76, 403/122, 403/316, 403/349
[51] Int. Cl. .......................................... F16c 11/06
[58] Field of Search ............... 287/90 R, 87, 88, 21; 29/149.5 B; 16/2; 285/209, 360; 403/71, 76, 122, 195, 201, 141, 316, 349

[56] References Cited
UNITED STATES PATENTS

| | | | |
|---|---|---|---|
| 1,131,399 | 3/1915 | McGinley | 285/203 |
| 2,849,712 | 8/1958 | Klancnik, Jr. | 287/21 X |
| 2,999,708 | 9/1961 | Dudash | 287/87 |
| 3,254,399 | 6/1966 | Zahuranec | 285/64 X |
| 3,378,284 | 4/1968 | Blanchard, Jr. | 287/87 X |
| 3,468,565 | 9/1969 | Roder | 285/360 X |

FOREIGN PATENTS OR APPLICATIONS

| | | | |
|---|---|---|---|
| 891,252 | 3/1962 | Great Britain | 287/90 R |

*Primary Examiner*—Andrew V. Kundrat
*Attorney, Agent, or Firm*—Waters, Roditi, Schwartz & Nissen

[57] ABSTRACT

A ball joint in which a ball socket member of resilient material such as synthetic resin receives a ball stem mounted on one end of a first link. The socket member is provided with a projecting member and a receiving flange which are spaced apart so that when the socket member is inserted in an opening of a second link and is turned, the peripheral edge portion of the second link around the opening is held between the projecting member and the flange. The socket member is also provided with a projection adapted to engage in an aperture in the second link to prevent relative turning movement therebetween.

8 Claims, 6 Drawing Figures

BALL JOINT APPARATUS

BACKGROUND

1. Field of the Invention

The invention relates to a ball joint apparatus adapted for use, for example, in a windshield wiper mechanism for a motorcar or the like.

2. Prior Art

It is conventional in this kind of ball joint apparatus to employ a separate member to fix a link to a ball socket member receiving a ball stem. This is a deficiency in that it requires substantial labor for the fixing operation causing possibilities of error while making the cost high.

SUMMARY OF THE INVENTION

An object of this invention is to provide an improved ball joint apparatus free from the foregoing deficiency which is characterized in that a socket member of a resilient material, such as synthetic resin or the like and adapted to receive a ball stem mounted at one end of a first link, is provided with a projecting member and a receiving flange in such spaced relationship therebetween that when the socket member is inserted in an opening of a second link and is turned, a peripheral edge portion of the second link around the opening is held between the projecting member and the receiving flange, the socket member also being provided with a projection adapted to be engaged in an aperture in the second link so that the socket member will be prevented from turning relative to the second link.

DETAILED DESCRIPTION

Figure 1:
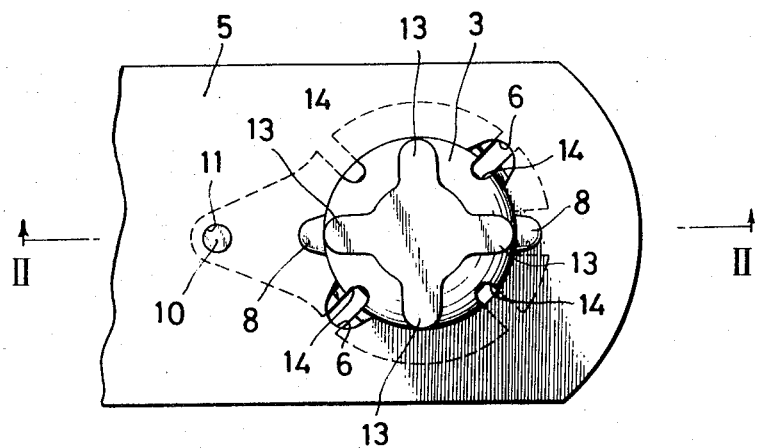
FIG. 1 is a top plan view of one embodiment according to this invention.

Numeral 1 denotes a first link having at one end a ball stem 2 secured thereto and numeral 3 denotes a socket member made of a resilient material, such as synthetic resin or the like, and having a socket portion 4 open at one side surface for receiving a ball portion of the ball stem 2. Numeral 5 denotes a second link provided with an opening 7 for insertion and fixing of the socket member 3, the link 5 having two notches 6 formed in the peripheral edge of opening 7 for a purpose to be apparent later. The socket member 3 is provided at the lower edge of socket portion 4 with two projecting members 8 adapted to pass through the notches 6 of the second link 5 and a receiving flange 9 adapted to receive, after the projecting members 8 pass through notches 6, the edge of the link 5 surrounding opening 7, in such a manner that there is a space between the projecting members 8 and the receiving flange 9. Additionally, socket member 3 is provided with a projection 10 adapted to be urged towards link 5 after the socket member 3 is inserted through the opening 7, the projection 10 being integrally connected at one side of the receiving flange 9 through a connecting resilient arm member 12. The second link 5 is provided with a hole 11 so positioned that when the socket member 3 is inserted in the opening 7 and is turned, the projection 10 will come into engagement in hole 11. The socket member 3 is also provided at the upper outer edge thereof with knob projections 13 to facilitate turning of the ball socket member 3. Additionally, the socket portion 4 is provided with several longitudinal slots 14 to facilitate mounting of the ball stem 2 in the socket portion.

After the ball stem 5 of the first link 1 is mounted in the socket portion 4 of the socket member 3, the socket member 3 is inserted in the opening 7 of link 5, the projecting members 8 being passed through the notches 6 until the receiving flange 9 bears against the peripheral edge of the link 5 around opening 7.

In the course of this engagement, the projection 10 is pushed by the link 5 against the resilient force of the connecting member 12. If then, the socket member 3 is turned, the peripheral edge of link 5 surrounding the opening 7 comes to be held between the projecting members 8 and the receiving flange 9 of the socket member 3, and the projection 10 can be engaged in the hole 11 when it becomes coincident therewith. Then, the socket member 4 becomes secured to the second link 5 so as not to be turnable and removable thereafter.

Figure 2:
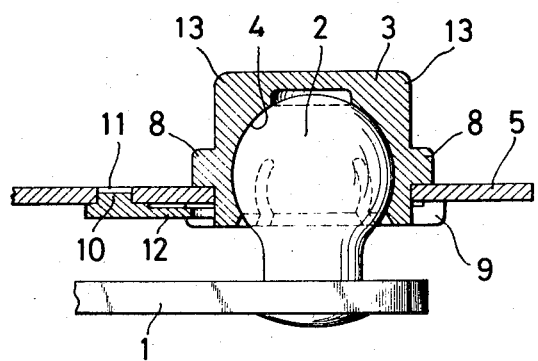
FIG. 2 is a sectional view taken along line II — II in FIG. 1.
Figure 3:
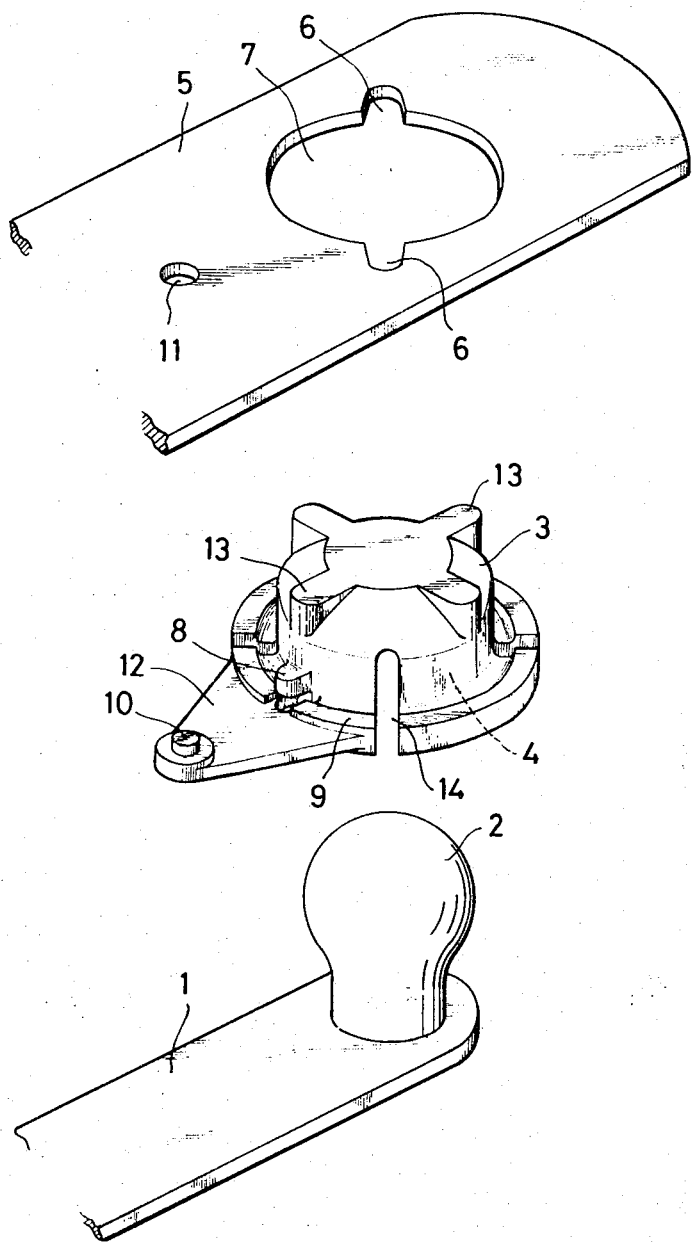
FIG. 3 is an exploded perspective view of the embodiment of FIG. 1.
Figure 4:
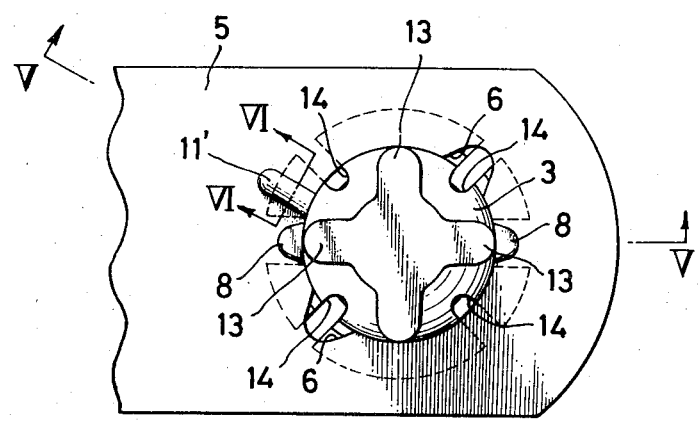
FIG. 4 is a top plan view of a second embodiment according to this invention.
Figure 5:
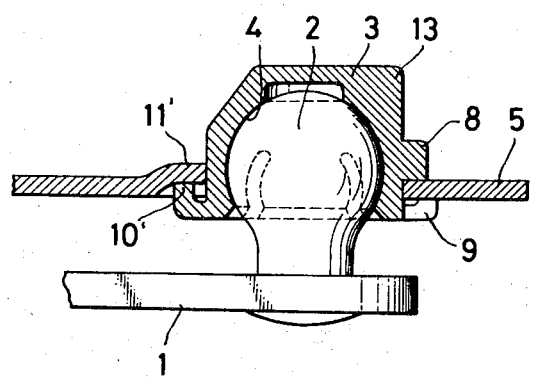
FIG. 5 is a sectional view taken along line V — VI in FIG. 4.
Figure 6:
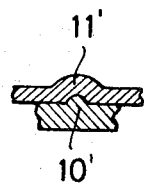
FIG. 6 is a sectional view taken along line VI — VI in FIG. 5.

FIGS. 4 to 6 show another embodiment of this invention, wherein projection 10' is directly formed on the upper surface of the receiving flange 9, and in replacement of the connecting member 12, the receiving flange 9 itself is made resilient. Additionally, the second link 5 is provided with a concavity 11' so that in almost the same manner as in the case of the embodiment in FIGS. 1 to 3 the projection 10' will become engaged therewith to prevent the socket member 3 from turning. Except for the above, this embodiment is entirely the same as that of FIGS. 1 to 3.

Thus, according to this invention, after the ball stem 2 of the first link 1 is mounted in the socket portion 4 of the socket member 3, the socket member 3 is inserted in the opening 7 of the second link 5 and is turned, so that the peripheral edge portion of the link 5 around opening 7 is held between the projecting members 8 and the receiving flange 9 and at the same time the projection 10 or 10' is engaged with hole 11 or concavity 11' so that the socket member 3 is firmly secured to the second link 5. Accordingly, the securing or assembling operation becomes extremely simple and the construction is simple and economical since separate members for fixing purposes are not required.

What is claimed is:

1. A ball joint assembly comprising a socket member, a first link including a ball stem adapted for insertion in said socket member, said socket member including a projecting member and a receiving flange spaced from one another, and a second link having an opening through which said socket member is insertable with the ball stem engaged in said socket member, such that said second link can be brought to a position between the projecting member and receiving flange, and coupling means on said socket member and second link for holding the same together and preventing relative rotation therebetween, said coupling means being operatively engaged by turning the socket member and link relative to one another after insertion of the socket member in said opening, said coupling means including a resilient arm member extending radially from said flange and including a portion remote from said flange facing the second link, and a projection extending between said second link and resilient arm member at said facing location resiliently bearing between these elements when the socket member is inserted in said opening in said second link.

2. An assembly as claimed in claim 1 wherein said second link is provided with a notch extending into said opening, said projecting member passing through said notch when the socket member is inserted in said opening.

3. An assembly as claimed in claim 1 comprising knob projections externally on said socket member to facilitate turning thereof.

4. An assembly as claimed in claim 1 wherein said socket member is provided with longitudinal slots spaced around its periphery to facilitate engagement of the ball stem in said socket member.

5. An assembly as claimed in claim 1 wherein said projection is mounted on said arm member.

6. An assembly as claimed in claim 5 wherein said coupling means comprises means on said second link for receiving said projection and holding the same.

7. An assembly as claimed in claim 6 wherein said means on the second link for receiving said projection is constituted by a hole in said second link.

8. An assembly as claimed in claim 6 wherein said means on the second link for receiving said projection is constituted by a concavity in said second link.

* * * * *